United States Patent
Yamazaki et al.

(10) Patent No.: US 7,542,609 B2
(45) Date of Patent: Jun. 2, 2009

(54) DEVICE AND METHOD FOR IMAGE PROCESSING

(75) Inventors: Yasuhiro Yamazaki, Kawasaki (JP); Masayuki Tsuji, Kawasaki (JP)

(73) Assignee: Fujitsu Microelectronics Limited, Tokyo (JP)

( * ) Notice: Subject to any disclaimer, the term of this patent is extended or adjusted under 35 U.S.C. 154(b) by 479 days.

(21) Appl. No.: 11/089,359

(22) Filed: Mar. 25, 2005

(65) Prior Publication Data

US 2006/0133676 A1 Jun. 22, 2006

(30) Foreign Application Priority Data

Dec. 21, 2004 (JP) ............... 2004-368967

(51) Int. Cl.
G06K 9/62 (2006.01)
H04N 5/14 (2006.01)
H04N 9/64 (2006.01)

(52) U.S. Cl. ............... 382/209; 386/46; 375/240; 348/700; 382/236

(58) Field of Classification Search ............... 382/209, 382/217–222, 236; 386/46; 375/240–240.29; 348/154, 155, 451, 452, 700–702

See application file for complete search history.

(56) References Cited

U.S. PATENT DOCUMENTS 6,330,344 B1 * 12/2001 Kondo et al. ............... 382/107
7,245,398 B2 * 7/2007 Namizuka ............... 358/2.1
2003/0142750 A1 * 7/2003 Oguz et al. ............... 375/240.18

OTHER PUBLICATIONS

Patent Abstracts of Japan, Publication No. 07-079431, Published Mar. 20, 1995.
Patent Abstracts of Japan, Publication No. 2000-324499, Published Nov. 24, 2000.

* cited by examiner

Primary Examiner—Aaron W Carter
(74) Attorney, Agent, or Firm—Staas & Halsey LLP

(57) ABSTRACT

In an image processing device, a scene-change detection unit captures first data of first pixels constituting a first picture and second data of second pixels constituting a second picture with the first and second pixels thinned out, and detects a scene change in the first picture based on differences between the first and second data, where the second picture immediately precedes the first picture. A transfer control unit controls operations of reading out at intervals from a storage device data of groups of a predetermined number of pixels consecutively arranged along a horizontal direction in at least the second picture, and transferring the data of the groups to the scene-change detection unit through a data bus, where the predetermined number corresponds to the maximum number of pixels which can be concurrently transferred through the data bus, or an integer multiple of the maximum number.

6 Claims, 9 Drawing Sheets

DEVICE AND METHOD FOR IMAGE PROCESSING

CROSS-REFERENCE TO RELATED APPLICATIONS

This application is based upon and claims the benefits of priority from the prior Japanese Patent Application No. 2004-368967, filed on Dec. 21, 2004, the entire contents of which are incorporated herein by reference.

BACKGROUND OF THE INVENTION

1) Field of the Invention

The present invention relates to an image processing device and an image processing method which detect a scene change based on inputted moving-image data, and in particular to an image processing device and an image processing method which capture data of pictures with the pixels of the pictures thinned out, and use the captured data for detection of a scene change.

2) Description of the Related Art

In recent years, it has become common practice to handle moving images in a form of digital data by using compressive encoding such as MPEG (Moving Picture Expert Group). For example, use of the video recorders has been widely spread. In the video recorders, the contents of television broadcasts are recorded in recording mediums such as optical discs in the form of digital data.

The moving-image data are normally displayed by switching still images tens of times per second, where each of the still images is called a frame (or a field in the interlace mode). When moving-image data are encoded in accordance with the MPEG standard, one of the attributes I, B, and P is assigned to each frame. The I frame is a frame constituted independently of the other frames without having information on time-dependent variations. The P frame is a frame produced by predictive encoding based on a preceding frame. The B frame is a frame produced by predictive encoding based on both of a preceding frame and a following frame.

Since, generally, successive frames in moving images highly correlate with each other, the B frames can achieve higher compression ratios than the I or P frames. However, it is necessary to arrange an I frame at a leading position of moving-image data. In addition, the I frames have advantages that editing of images is easy, and the I frames can be quickly displayed in fast-forward or backward reproduction. Therefore, normally I frames are inserted at intervals of tens to hundreds of frames. In the normal encoding procedures, the structure of the GOP (groups of pictures) is prescribed as an independent reproduction unit containing at least one I frame, and I, B, and P frames are successively produced in an order prescribed in the GOP structure, so that both of high compression ratios and high convenience such as high random-access performance are realized.

Nevertheless, when moving images are reproduced in accordance with the GOP structure, in some cases, it is impossible to achieve a high compression ratio at a boundary portion at which a scene change occurs. For example, a scene change occurs when a video recording sequence is temporarily stopped, and is thereafter restarted, or when a scene in a television is switched to a commercial, or on other similar occasions, and each frame immediately following a scene change has very low correlation to a preceding frame. Therefore, when a B or P frame is produced immediately following a scene change, the effect of data compression becomes low, and the image quality deteriorates. In order to overcome this problem, a technique of detecting a scene change, and controlling an attribute of a picture to be encoded has been considered.

FIG. 9 is a schematic diagram illustrating a construction of a conventional MPEG encoding circuit containing a scene-change detection circuit, and shows data flows in the case where the encoded frames in the prescribed GOP structure are P frames. In FIG. 9, a difference detection unit 501 calculates a difference between a first frame which is to be encoded and a second frame which immediately precedes the first frame. A scene-change detection unit 502 detects a scene change based on the first frame and the second frame. A selector 503 selects one of data representing the first frame and data representing the difference outputted from the difference detection unit 501. A data compression unit 504 compressively encodes the data selected by the selector 503.

In the above MPEG encoding circuit of FIG. 9, when no scene change is detected by the scene-change detection unit 502, the selector 503 selects the data from the difference detection unit 501. Thus, compressive encoding is performed based on data representing the difference between the first frame to be encoded and the second frame immediately preceding the first frame, so that a P frame is outputted from the MPEG encoding circuit. On the other hand, when a scene change is detected in the first frame to be encoded, by the scene-change detection unit 502, the selector 503 selects the data representing the first frame, and compressive encoding is performed by using only the data representing the first frame, so that an I frame is outputted from the MPEG encoding circuit.

According to the above construction of the MPEG encoding circuit, when a scene change occurs, the frame immediately following the scene change is an I frame regardless of the GOP structure, and inter-frame predictive encoding, which is ineffective and useless in data compression immediately after a scene change, is not performed. Thus, the image quality can be improved. In addition, it becomes possible to reliably search for a leading frame following a scene change by fast-forward reproduction or the like, or easily generate a thumbnail image of the leading frame for indexing.

In order to detect a scene change, generally, the so-called pixel difference method is used. According to the pixel difference method, a pixel difference between frames is obtained. Specifically, an absolute value of a difference in the value of a pixel at each position between frames is obtained, and the absolute values obtained at the respective pixel positions are accumulated. When the accumulated value is greater than a preset threshold value, it is determined that a scene change occurs.

Further, a technique as an application of the above pixel difference method has been disclosed, for example, in Japanese Unexamined Patent Publication No. 2000-324499 (Paragraphs <0020> to <0027> and FIG. 2). According to the disclosed technique, a first image correlation value, which corresponds to the accumulated value, is obtained. In addition, a second image correlation value, which corresponds to an inter-frame difference of the first image correlation value, is obtained. When the second image correlation value exceeds a threshold value, it is determined that a scene change occurs. Thus, only a true scene change in a moving image is detected with higher reliability even when the motion in the moving image is rapid.

Further, the motion vector method is known as another method for detecting a scene change. According to the motion vector method, a motion in an image from a frame to another frame is detected. Specifically, presence or absence of an image which is identical between the frames is detected in each of small rectangular sections. When absence is detected in a majority of the small rectangular sections, it is determined that a scene change occurs.

Although the motion vector method enables detection of a scene change with higher accuracy than the pixel difference method, the motion vector method requires more complicated processing. However, currently, there are strong demands for suppressing the processing load, the circuit size, and the manufacturing cost in image encoding. That is, it is desired to increase the accuracy in the detection by use of the pixel difference method.

Nevertheless, even when the pixel difference method is used, it is necessary to supply image data for a plurality of frames to the circuit as illustrated in FIG. 9 in order to perform processing for compressive encoding of the data and detection of a scene change. Therefore, a heavy load is imposed on the system bus through which data are transferred, and the transfer rate of the system bus is required to be increased. However, the necessity for the increase in the transfer rate of the system bus is a factor which impedes suppression of the circuit size and the manufacturing cost.

SUMMARY OF THE INVENTION

The present invention is made in view of the above problems, and a first object of the present invention is to provide an image processing device which imposes a reduced load on a data bus during transfer of image data, can accurately detect a scene change, and can be manufactured at reduced cost.

A second object of the present invention is to provide an image processing method which can reduce a load imposed on a data bus during transfer of image data without deteriorating the accuracy in detection of a scene change, and the manufacturing cost of circuitry for performing the image processing.

In order to accomplish the first object, an image processing device for detecting a scene change based on moving-image data is provided. The image processing device comprises: a scene-change detection unit which captures first data of first pixels constituting a first picture and second data of second pixels constituting a second picture with the first and second pixels thinned out, and detects presence or absence of a scene change in the first picture based on differences between the first data and the second data, where the second picture immediately precedes the first picture; and a transfer control unit which controls a first operation of reading out at intervals from a storage device data of groups of a predetermined number of pixels consecutively arranged along a horizontal direction in at least the second picture of the first and second pictures, and a second operation of transferring the data of the groups to the scene-change detection unit through a data bus having a width, where the predetermined number is determined based on the width, and corresponds to the maximum number of pixels which can be concurrently transferred through the data bus, or an integer multiple of the maximum number.

In order to accomplish the second object, an image processing method for detecting a scene change based on moving-image data is provided. The image processing method comprises the steps of: (a) under control of a transfer control unit, reading out at intervals from a storage device data of groups of a predetermined number of pixels which are consecutively arranged in a horizontal direction in at least a first picture, and transferring the data of the groups to a scene-change detection unit through a data bus having a width, where the first picture is a picture which immediately precedes a second picture in which presence or absence of a scene change is to be detected, and the predetermined number is determined based on the width, and corresponds to the maximum number of pixels which can be concurrently transferred through the data bus, or an integer multiple of the maximum number; and (b) by the scene-change detection unit, capturing first data of pixels constituting the first picture unit and second data of pixels constituting the second picture, calculating differences between the first data and the second data, and detecting presence or absence of a scene change based on the differences.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

An embodiment of the present invention is explained below with reference to drawings.

Figure 1:
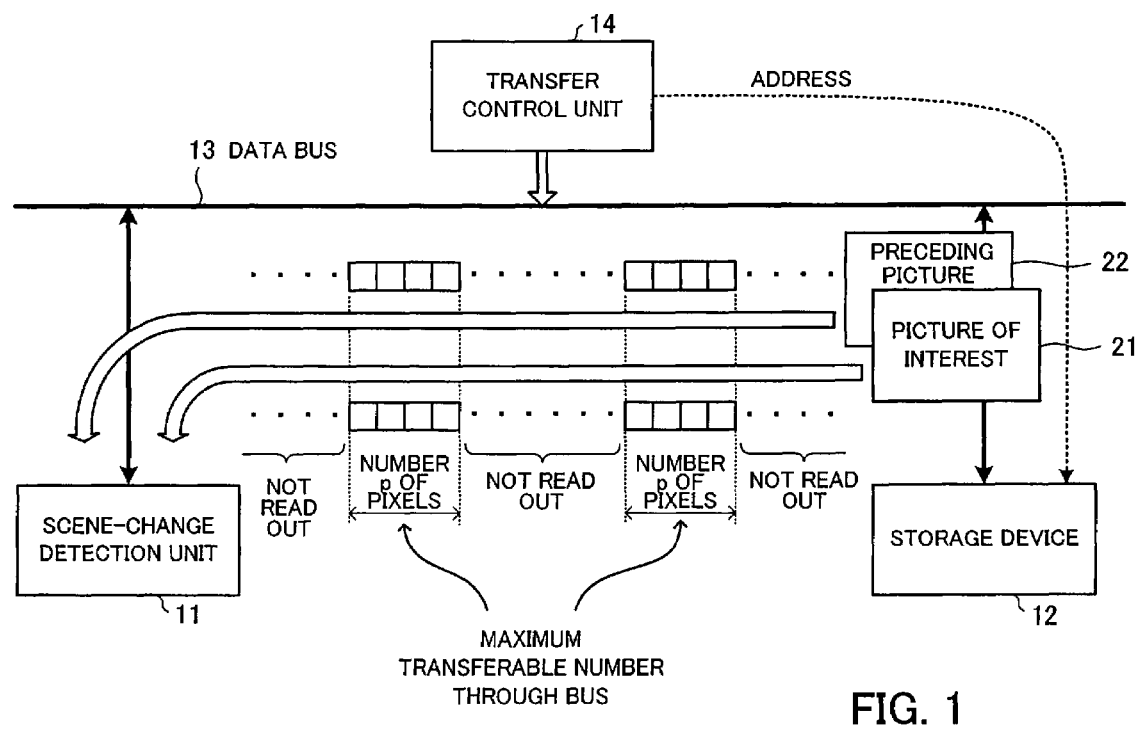
FIG. 1 is a schematic diagram illustrating an image processing device as an embodiment of the present invention.

FIG. 1 is a schematic diagram illustrating an image processing device as an embodiment of the present invention. The image processing device illustrated in FIG. 1 detects a scene change based on image data inputted into the image processing device, and FIG. 1 shows the main functions of the image processing device.

The image processing device of FIG. 1 comprises a scene-change detection unit 11, a storage device 12, a data bus 13, and a transfer control unit 14. The scene-change detection unit 11 detects a scene change, the storage device 12 temporarily stores image data, and the transfer control unit 14 controls transfer of image data from the storage device 12 to the scene-change detection unit 11 through the data bus 13.

The scene-change detection unit 11 detects presence or absence of a scene change based on differences in pixel values between a picture 21 in which presence or absence of a scene change is to be detected and a picture 22 which immediately precedes the picture 21. Specifically, the scene-change detection unit 11 captures only thinned-out pixels of each picture, instead of all of the pixels constituting the picture, and calculates differences in the values of the thinned-out pixels between the pictures 21 and 22. Thus, the processing time can be reduced.

The transfer control unit 14 issues a read address to the storage device 12, and controls data readout and data transfer through the data bus 13 to the scene-change detection unit 11. For example, the transfer control unit 14 can be realized by a CPU (central processing unit), a DMA (direct memory access) controller, or the like.

In the above image processing device, at least the picture 22 (which immediately precedes the picture 21 in which presence or absence of a scene change is to be detected) is temporarily stored in the storage device 12, and is thereafter supplied to the scene-change detection unit 11. At this time, the data of the pixels of the picture 22 are thinned out under control of the transfer control unit 14, and the data of the thinned-out pixels of the picture 22 are supplied to the scene-change detection unit 11 through the data bus 13. In addition, the picture 21 (in which presence or absence of a scene change is to be detected) may be directly supplied to the scene-change detection unit 11 from an external device such as a video capture unit or a communication interface, or may be temporarily stored in the storage device 12 and thereafter supplied to the scene-change detection unit 11. In the case where the picture 21 is temporarily stored in the storage device 12, the data of the pixels of the picture 21 are thinned out under control of the transfer control unit 14, and the data of the thinned-out pixels of the picture 21 are supplied to the scene-change detection unit 11 through the data bus 13, as the picture 21.

When the transfer control unit 14 reads a picture from the storage device 12, a predetermined number p of consecutive pixels are continuously read out, and other pixels are not read out, where the predetermined number p is the maximum number of pixels the data of which can be concurrently transferred through the data bus 13, and can be determined based on the width of the data bus 13. For example, when the data of each pixel is represented by a byte, and the width of the data bus 13 is 32 bytes, data of at most four pixels can be concurrently transferred through the data bus 13 in each readout operation from the storage device 12.

Alternatively, when it is possible to guarantee that the system failure does not occur, the predetermined number p may be an integer multiple of the maximum number of pixels the data of which can be concurrently transferred through the data bus 13.

The accuracy in the detection of a scene change by the scene-change detection unit 11 increases with the total number of pixels used for the detection. However, in the case where the total number of pixels used for the detection is identical, the transfer of the predetermined number of consecutive pixels as described before reduces the time necessary for transfer of image data while maintaining the accuracy in the detection. Therefore, according to the present invention, the load imposed on the data bus 13 and the manufacturing cost can be reduced without decreasing the accuracy in detection of a scene change.

In the case where the total size of data which are to be read out from or written in the storage device 12 is identical, the system failure is less likely to occur when the time intervals between read requests or write requests are greater. Therefore, when there are a plurality of horizontal pixel lines in each of which groups of the predetermined number p of consecutive pixels are assigned to be read out, it is desirable that the maximum number of consecutive pixels which are not read out from the above plurality of horizontal pixel lines is greater than the maximum number of consecutive pixel lines in each of which no pixels are read out. In this case, the intervals between readout requests become averagely great, and therefore it is possible to realize redundancy and stable operation of the system without decreasing the accuracy in detection of a scene change.

In addition to the above conditions, it is desirable that the groups of the consecutive pixels in the plurality of horizontal pixel lines are arranged in a staggered configuration. In this case, the positions of the pixels used for the detection of a scene change can be scattered. Therefore, it is possible to further increase the accuracy in the detection while stabilizing the operation of the system.

Hereinbelow, an embodiment of the present invention is explained in detail. In the following explanations, a device which receives an image signal of a television broadcast, converts the image signal into a digital signal, and compressively encodes the digital signal in accordance with the MPEG standard is taken as an example of the image processing device according to the present invention.

Figure 2:
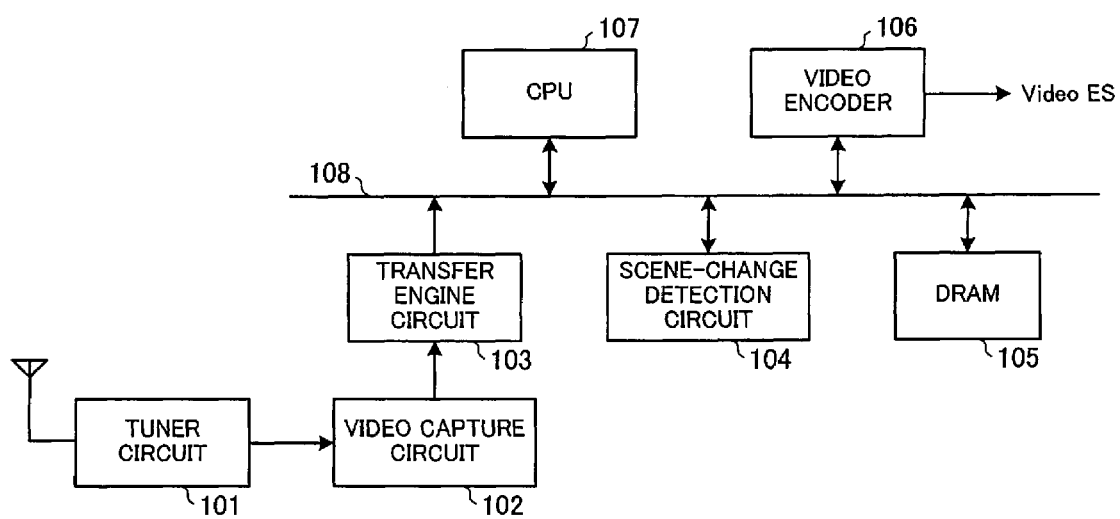
FIG. 2 is a diagram illustrating a concrete construction of the image processing device as the embodiment.

FIG. 2 is a diagram illustrating a concrete construction of the image processing device as the embodiment. The image processing device of FIG. 2 comprises a tuner circuit 101, a video capture circuit 102, a transfer engine circuit 103, a scene-change detection circuit 104, a DRAM (dynamic random access memory) 105, a video encoder 106, and a CPU 107. The transfer engine circuit 103, the scene-change detection circuit 104, the DRAM 105, the video encoder 106, and the CPU 107 are interconnected through a system bus 108 so that data can be transferred therebetween.

The tuner circuit 101 receives a broadcast wave having a predetermined carrier wavelength through an external antenna, demodulates the received signal, and outputs an analog image signal. The video capture circuit 102 captures the analog image signal, and converts the analog image signal into uncompressed digital image data. The transfer engine circuit 103 is an interface with the system bus 108, and transfers image data from the transfer engine circuit 103 through the system bus 108 under control of the CPU 107.

The scene-change detection circuit 104 receives through the system bus 108 image data of a picture in which presence or absence of a scene change is to be detected and image data of a preceding picture, and detects presence or absence of a scene change based on values of the differences in the image data between the pictures. The DRAM 105 provides working areas for processing performed by the scene-change detection circuit 104, the video encoder 106, and the like, and temporarily stores image data under control of the CPU 107.

The video encoder 106 successively and compressively encodes image data which are stored in the DRAM 105 under the control of the CPU 107 in accordance with the MPEG standard, and outputs an video ES (elementary stream). The video ES is multiplexed with another signal such as an audio ES which is produced concurrently with the video ES by encoding, and stored in a storage device such as an HDD (hard disk drive) or transmitted to an external device through a communication interface. Alternatively, a portion or all of the functions of the video encoder 106 may be realized by software processing executed by the CPU 107. The CPU 107 controls the image processing device in a centralized manner. Specifically, the CPU 107 controls the respective portions of the image processing device through the system bus 108, and controls data transfer through the system bus 108.

In the above image processing device, a television image received by the tuner circuit 101 is converted into digital image data by the video capture circuit 102, and the digital image data are outputted onto the system bus 108 through the transfer engine circuit 103. Then, the digital image data outputted onto the system bus 108 are temporarily stored in the DRAM 105, and are thereafter compressively encoded by the video encoder 106.

During the above processing, the scene-change detection circuit 104 detects presence or absence of a scene change in the image data which are successively outputted onto the system bus 108. When a scene change occurs, the scene-change detection circuit 104 outputs a detection signal to the video encoder 106. The video encoder 106 produces an I picture immediately after reception of the detection signal even when a B or P picture is required to be produced at that time based on the GOP structure. Thus, the quality of the image generated immediately after the scene change can be improved, and useless processing for compressive data encoding can be stopped.

Figure 3:
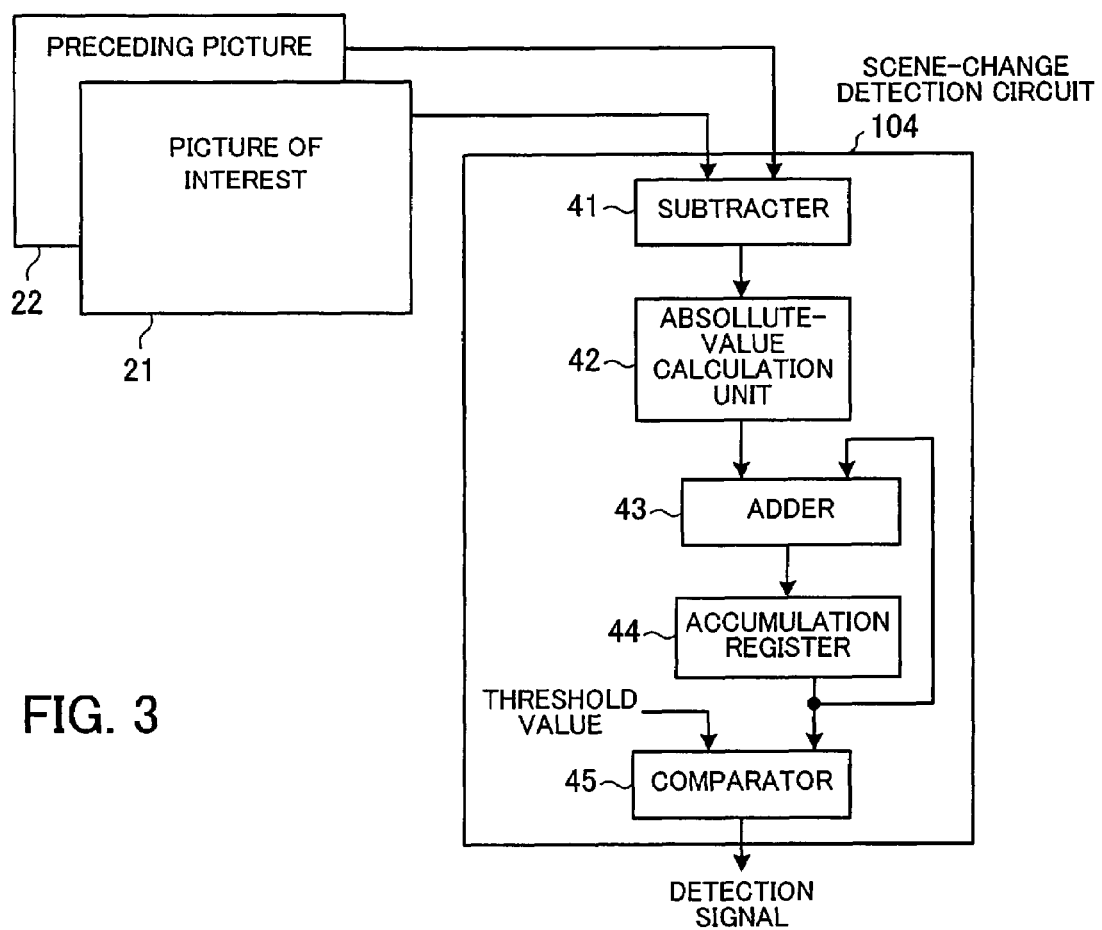
FIG. 3 is a diagram indicating an example of a scene-change detection circuit.

FIG. 3 is a diagram indicating an example of the scene-change detection circuit 104.

As illustrated in FIG. 3, the scene-change detection circuit 104 comprises a subtracter 41, an absolute-value calculation unit 42, an adder 43, an accumulation register 44, and a comparator 45.

The data of the picture 21 in which presence or absence of a scene change is to be detected and the image data of the immediately preceding picture 22 are successively inputted into the subtracter 41, which outputs values of the differences in the image data between the pictures 21 and 22, and the absolute-value calculation unit 42 calculates the absolute values of the values of the differences.

The adder 43 calculates a sum of an output value from the absolute-value calculation unit 42 and an output value of the accumulation register 44, and outputs the sum to the accumulation register 44. The accumulation register 44 holds the output of the adder 43. The value held in the accumulation register 44 is outputted to the comparator 45, and is also fed back to the adder 43. Thus, the absolute values of the differences in the values of the respective pixels between the pictures 21 and 22 are successively accumulated and stored in the accumulation register 44. The accumulation register 44 is reset when an operation for detecting a scene change in a picture is completed.

The comparator 45 compares the value held in the accumulation register 44 with a predetermined threshold value. When the value held in the accumulation register 44 exceeds the predetermined threshold value, the comparator 45 determines that a scene change occurs, and outputs a detection signal.

Each of the above functions of the scene-change detection circuit 104 may be realized by hardware using various gate circuits and the like, or software processing executed by the CPU 107.

In the scene-change detection circuit 104, the subtracter 41 receives thinned-out pixels of the pictures 21 and 22, instead of all of the pixels of the pictures 21 and 22, so that the processing speed of the scene-change detection circuit 104 is increased.

Specifically, in the present embodiment, the scene-change detection circuit 104 acquires the image data of thinned-out pixels of the picture 22 (immediately preceding the picture 21 in which presence or absence of a scene change is to be detected) by receiving data which are thinned out when the data are read out from the DRAM 105 under control of the CPU 107. On the other hand, the scene-change detection circuit 104 directly receives the image data of the pixels of the picture 21 from the video capture circuit 102 through the transfer engine circuit 103. That is, the image data of all pixels of the picture 21 which are generated by the video capture circuit 102 are stored in the DRAM 105 through the system bus 108, and supplied to the scene-change detection circuit 104. The scene-change detection circuit 104 captures image data of only necessary pixels of the picture 21 from the image data of all pixels of the picture 21 which are supplied to the scene-change detection circuit 104.

Hereinbelow, the operations of thinning out pixels are explained in detail by using three examples, where it is assumed that the width of a bus used for data transfer in the system bus 108 is 32 bits, and data of each pixel in each picture is represented by a byte.

Figure 4:
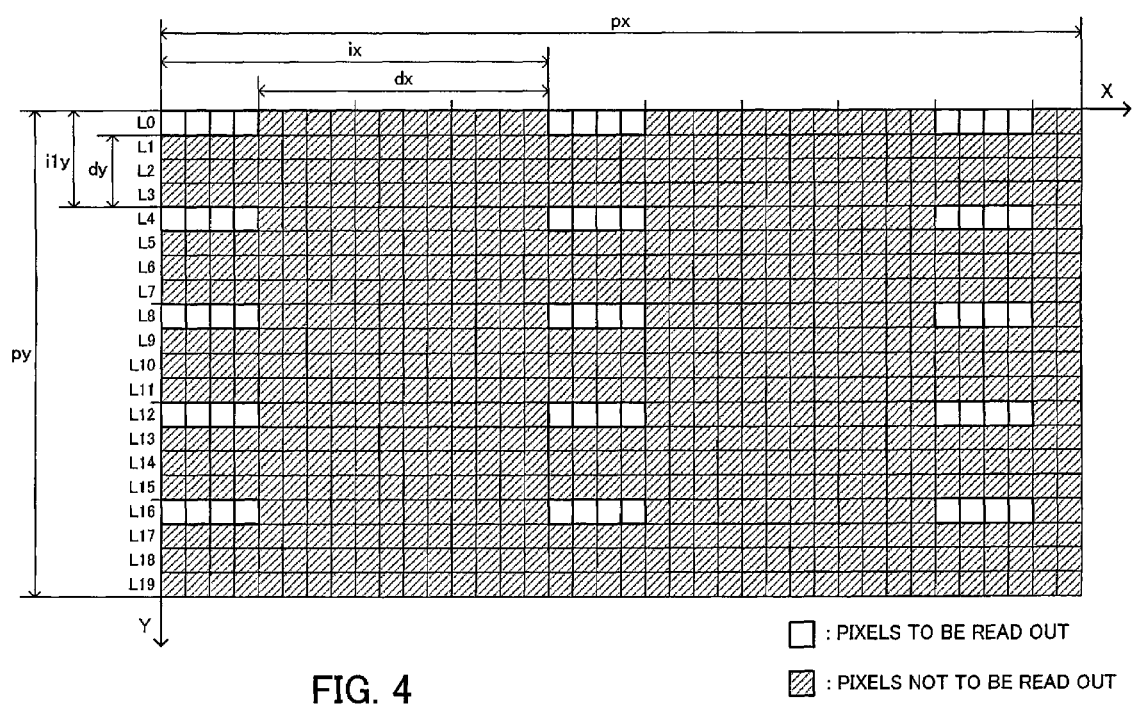
FIG. 4 is a diagram indicating a first example of arrangement of pixels which are used for detection of a scene change.

FIG. 4 is a diagram indicating a first example of arrangement of pixels which are used for detection of a scene change. FIG. 4 shows an arrangement of pixels of a picture the data of which are temporarily stored in the DRAM 105, where pixels to be read out for use in the detection of a scene change are indicated by blank squares, and pixels which are not used for the detection of a scene change are indicated by hatched squares. (The pixels are also indicated in the same manner in FIGS. 6 and 7, which will be referred to later for explanations of the second and third examples of arrangement of pixels.)

In the case where the width of a bus used for data transfer in the system bus 108 is 32 bits, the load imposed on the system bus 108 (the time for which the system bus 108 is occupied) is identical in either of the case where data of only one pixel (one byte) are read out at a time from the DRAM 105 and the case where data of four pixels (four bytes) are read out at a time from the DRAM 105. Therefore, the utilization efficiency of the system bus 108 in the case where data of four pixels (four bytes) are read out at a time from the DRAM 105 is higher than the utilization efficiency in the case where data of only one pixel (one byte) are read out at a time from the DRAM 105. In the example of FIG. 4, from each of the pixel lines L0, L4, L8, L12, and L16, four consecutive pixels are read out at intervals of 12 pixels, and transferred to the scene-change detection circuit 104 for use in the calculation of the differences.

Figure 5:
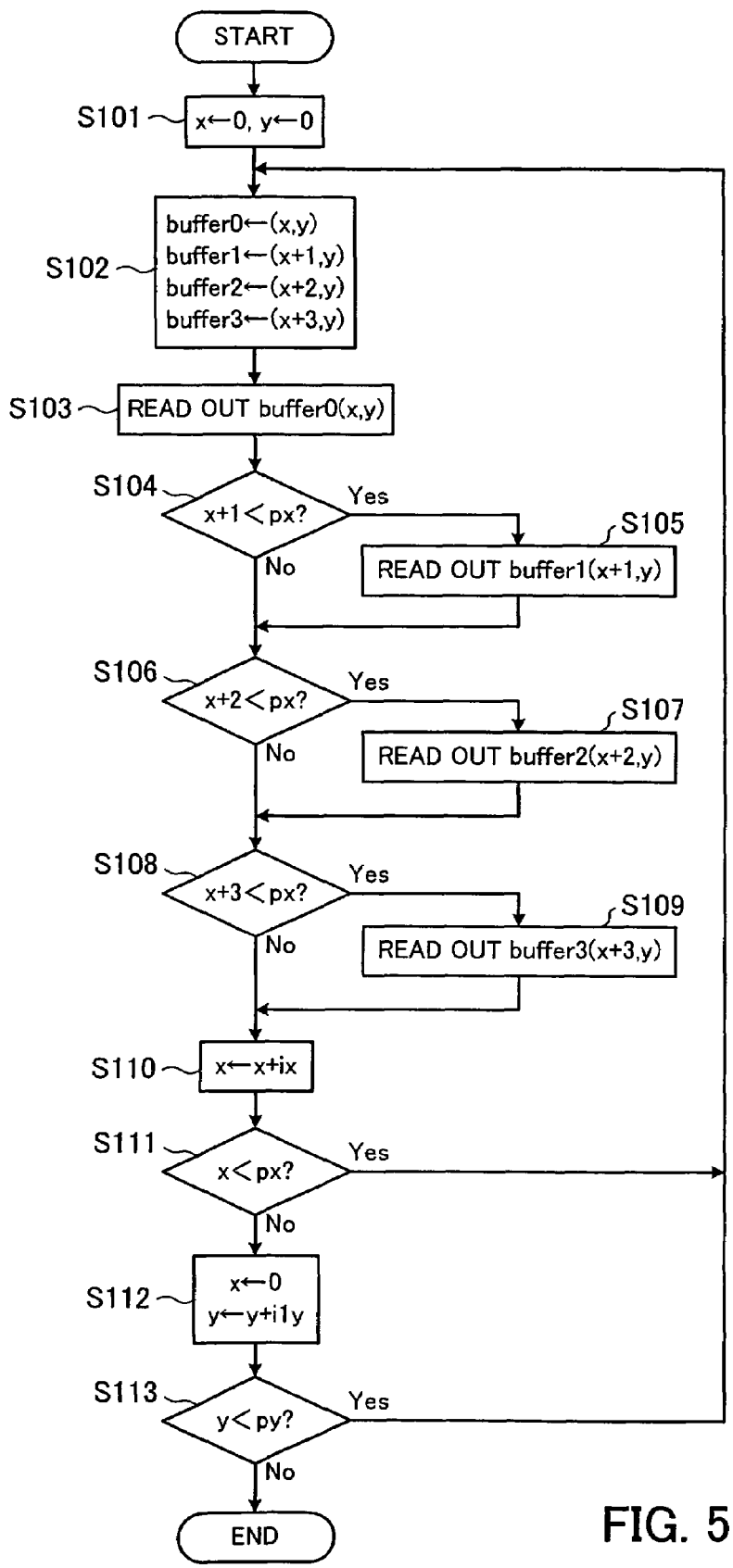
FIG. 5 is a flow diagram indicating a sequence of processing for reading out image data from a DRAM by a CPU in the case where pixels used for detection are arranged as illustrated in FIG. 4.

FIG. 5 is a flow diagram indicating a sequence of processing for reading out image data from the DRAM 105 by the CPU 107 in the case where pixels used for detection are arranged as illustrated in FIG. 4. In FIG. 4, the number of pixels arranged in the horizontal direction in each picture is indicated by px, the number of pixels arranged in the vertical direction in each picture is indicated by py, the displacement from the leading pixel of each group of four consecutive pixels to the leading pixel of the next group of four consecutive pixels in order of readout is indicated by the number ix of pixels, and the displacement from each pixel line from which pixels are read out to the next pixel line from which pixels are read out is indicated by the number i1y of pixel lines.

<Step S101> The variables x and y for address calculation are initialized.

<Step S102> The addresses of four pixels "buffer0," "buffer1," "buffer2," and "buffer3" which are consecutively arranged in the horizontal direction and constitute a pixel group are generated.

<Step S103> The addresses (x, y) of the first one "buffer0" of the four consecutive pixels are designated in the DRAM 105 so that data of the first pixel are transferred to the scene-change detection circuit 104.

<Step S104> When the address (x+1) in the horizontal direction of the next pixel "buffer1" in order of readout (i.e., the second pixel) is smaller than px, the operation goes to step S105. Otherwise, the operation goes to step S106.

<Step S105> The addresses of the second one "buffer1" of the four consecutive pixels are designated in the DRAM 105 so that data of the second pixel are transferred to the scene-change detection circuit 104.

<Step S106> When the address (x+2) in the horizontal direction of the next pixel "buffer2" in order of readout (i.e., the third pixel) is smaller than px, the operation goes to step S107. Otherwise, the operation goes to step S108.

<Step S107> The addresses of the third one "buffer2" of the four consecutive pixels are designated in the DRAM 105 so that data of the third pixel are transferred to the scene-change detection circuit 104.

<Step S108> When the address (x+3) in the horizontal direction of the next pixel "buffer3" in order of readout (i.e., the fourth pixel) is smaller than px, the operation goes to step S109. Otherwise, the operation goes to step S110.

<Step S109> The addresses of the fourth one "buffer3" of the four consecutive pixels are designated in the DRAM 105 so that data of the fourth pixel are transferred to the scene-change detection circuit 104.

<Step S110> The variable x is incremented by ix.

<Step S111> When the variable x is smaller than px, the operation goes back to step S102, and processing for reading out the next pixel group constituted by four consecutive pixels is performed. Thus, the (ix−4) pixels located between the four consecutive pixels read out in steps S103, S105, S107, and S109 and the next pixel group are not read out. When the variable x is equal to or greater than px, the operation goes to step S112.

<Step S112> The variable x is set to zero, and the variable y is incremented by i1y, so that the pixel line from which pixels are to be read out proceeds by i1y pixel lines.

<Step S113> When the variable y is smaller than py, the operation goes back to step S102, and processing for reading out a pixel group constituted by four consecutive pixels on the new pixel line is performed. When the variable y is equal to or greater than py, the processing for reading out the data of the picture is completed.

Figure 6:
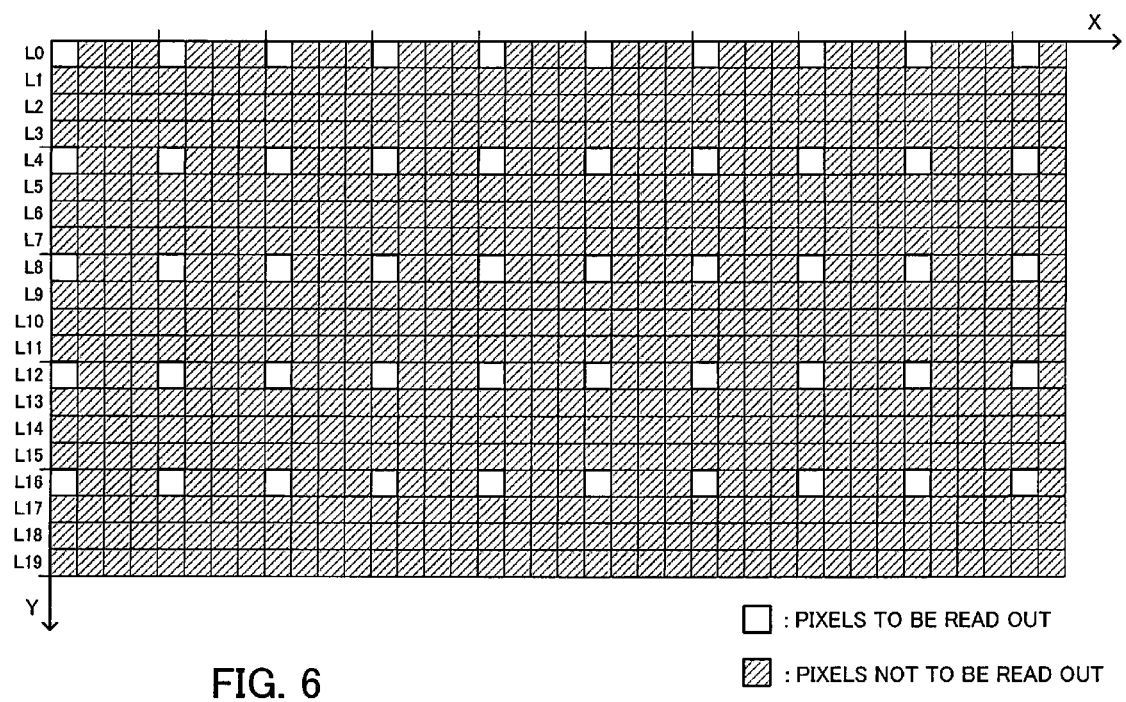
FIG. 6 is a diagram indicating a second example of arrangement of pixels which are used for detection of a scene change, where the total number of the pixels used for detection in the arrangement of FIG. 6 is almost identical to the total number of the pixels used for detection in the arrangement of FIG. 4.

FIG. 6 is a diagram indicating a second example of arrangement of pixels which are used for detection of a scene change, where the total number of the pixels used for detection in the arrangement of FIG. 6 is almost identical to the total number of the pixels used for detection in the arrangement of FIG. 4.

In the example of FIG. 6, data are read out from only the pixel lines L0, L4, L8, L12, and L16, as in the example of FIG. 4. The arrangement of pixels used for detection of a scene change in the example of FIG. 6 is different from the arrangement in the example of FIG. 4 in that data of only one pixel out of every four pixels in each of the above pixel lines is read out.

Since the total number of the pixels used for detection in the arrangement of FIG. 6 is almost identical to the total number of the pixels used for detection in the arrangement of FIG. 4, the accuracy in detection of a scene change in the picture of FIG. 6 is approximately equal to the accuracy in detection of a scene change in the picture of FIG. 4. However, since data of only one pixel are read out at a time in the case of FIG. 6, data of only one byte are transferred through the system bus 108 having the data bus width of 32 bits when the data of only one pixel is read out. On the other hand, since data of four pixels are read out at a time in the case of FIG. 4, data of four bytes are transferred through the system bus 108 when the data of four pixels are read out. Therefore, the time necessary for transferring the designated data in each picture to the scene-change detection circuit 104 in the case of FIG. 4 is about one fourth of the time necessary for transferring the designated data in each picture to the scene-change detection circuit 104 in the case of FIG. 6.

That is, when data of consecutive pixels corresponding to the width of the data bus are read out at a time as in the case of FIG. 4, it is possible to reduce the time necessary for transferring designated data in each picture to the scene-change detection circuit 104 without deteriorating the accuracy in detection of a scene change. In addition, it is possible to transfer data for other purposes (e.g., for capture of image data from the video capture circuit 102, transfer of image data to the video encoder 106, and the like) in the intervals between the operations of transferring the image data to the scene-change detection circuit 104. Therefore, it is possible to increase the processing capacity by increasing the processing efficiency without increasing the bus width and the manufacturing cost.

However, in order to maintain the redundancy of the system, the number of consecutive pixels which are read out at a time may be set so that the width of the data of the consecutive pixels which are continuously read out is slightly smaller than the width of the data bus.

Incidentally, in the example of FIG. 4, the maximum number dx of consecutive pixels which are not read out from the pixel lines from which the designated pixels are read out (i.e., the pixel lines L0, L4, L8, L12, and L16) is greater than the maximum number dy of consecutive pixel lines in each of which no pixels are read out (e.g., the pixel lines L1, L2, and L3). Therefore, the intervals between the groups of consecutive pixels which are to be read out from each pixel line are increased, and the intervals between groups of consecutive pixels which are to be successively read out and located in different pixel lines is decreased, so that the time intervals between readout requests become averagely great, i.e., the times at which the readout requests are issued are scattered. Thus, it is possible to prevent imposition of a heavy load on the system bus 108 in a short time and failure of the system.

Figure 7:
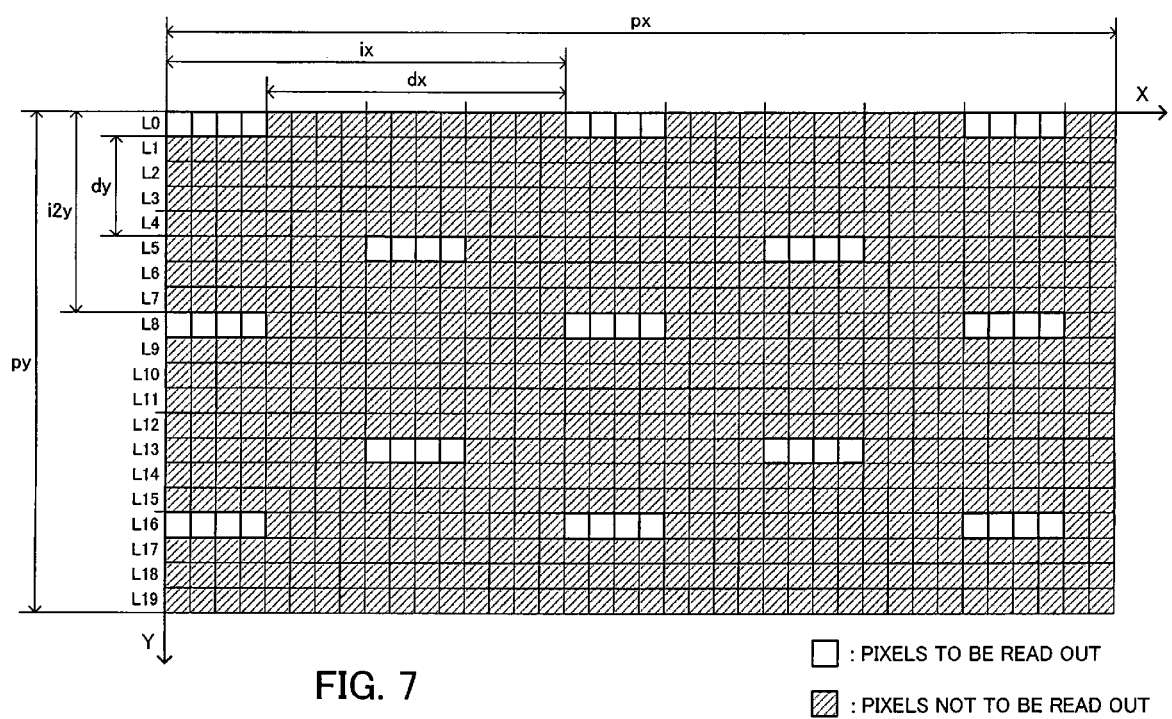
FIG. 7 is a diagram indicating a third example of arrangement of pixels which are used for detection of a scene change.

Further, when the groups of the consecutive pixels in the plurality of pixel lines which are assigned to be read out are arranged in a staggered configuration, for example, as in the third example arrangement of pixels illustrated in FIG. 7, the portions of each picture the data at which are used for detection of a scene change are scattered, and therefore the accuracy in the detection can be improved.

FIG. 7 is a diagram indicating the third example of arrangement of pixels which are used for detection of a scene change.

In the example of FIG. 7, as in the case of FIG. 4, data of four consecutive pixels are read out at a time from the DRAM 105, so that the utilization efficiency of the system bus 108 is increased. In addition, in order to stabilize the system, the maximum number dx of consecutive pixels which are not read out from the pixel lines from which the four consecutive pixels are read out is greater than the maximum number dy of consecutive pixel lines in each of which no pixels are read out. Further, the group of the four consecutive pixels in the plurality of pixel lines are arranged in a staggered configuration. For example, the horizontal position of each group of four consecutive pixels in the pixel line L5 corresponds to the center of the horizontal extent of an interval between two groups of four consecutive pixels in the pixel line L0.

In the example of FIG. 7, the moving-image signal inputted into the image processing device is in an interlace mode, and the line numbers L0 to L19 are assigned to the pixel lines constituting a frame, which is composed of an even field and an odd field.

In the case of the interlace mode, a scene change can occur either when an even field comes after an odd field, or when an odd field comes after an even field. Therefore, it is necessary to assign the pixels to be read out for detection of a scene change in both of the odd and even fields. In consideration of this condition, in the example of FIG. 7, the groups of four consecutive pixels which are to be read out for use in detection of a scene change are located in the even pixel lines L0, L8, and L16 and the odd pixel lines L5 and L13 in each frame. In addition, the groups of four consecutive pixels on the even pixel lines are staggered in the horizontal direction from the groups of four consecutive pixels on the odd pixel lines, so that every scene change can be detected with high reliability whenever the scene change occurs.

Figure 8:
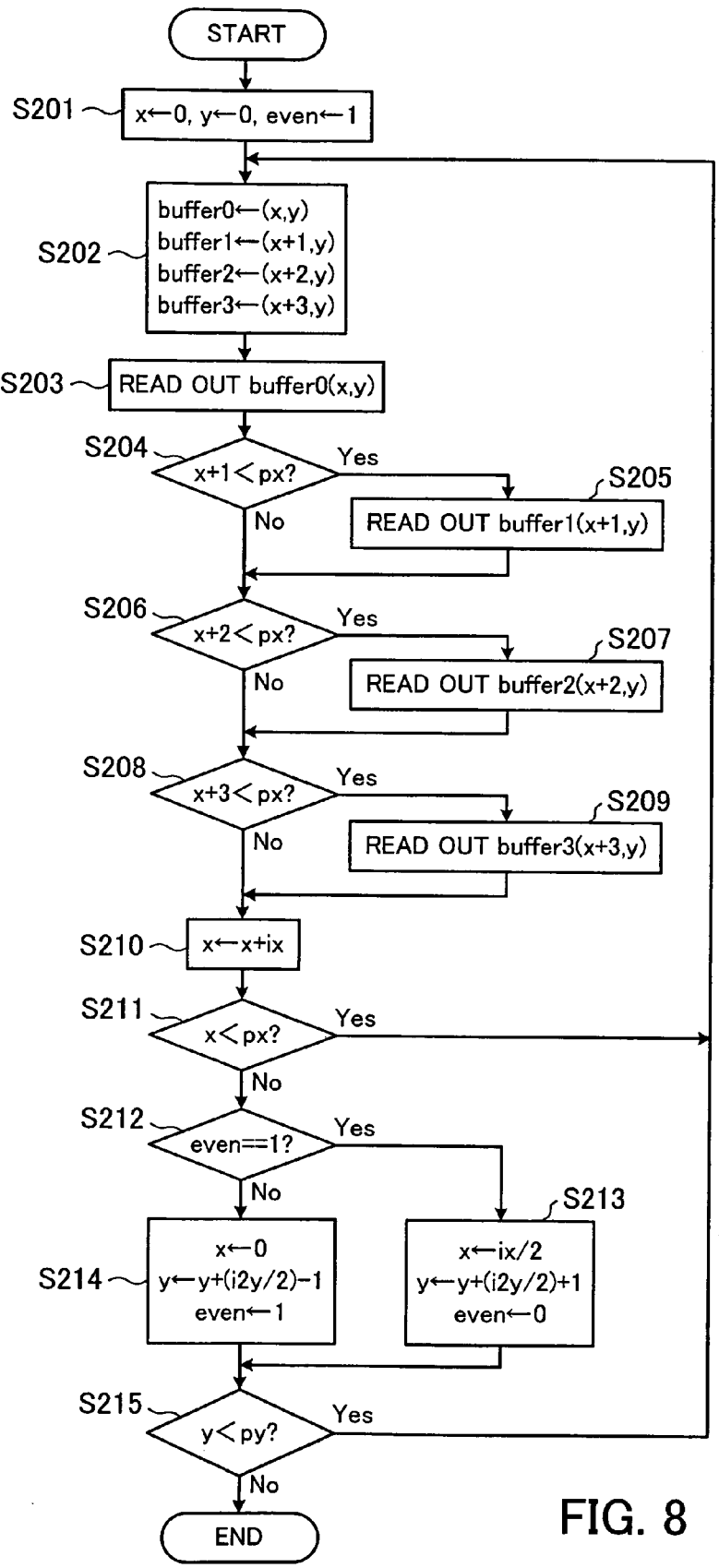
FIG. 8 is a flow diagram indicating a sequence of processing for reading out image data from a DRAM by a CPU in the case where pixels used for detection are arranged as illustrated in FIG. 7.
Figure 9:
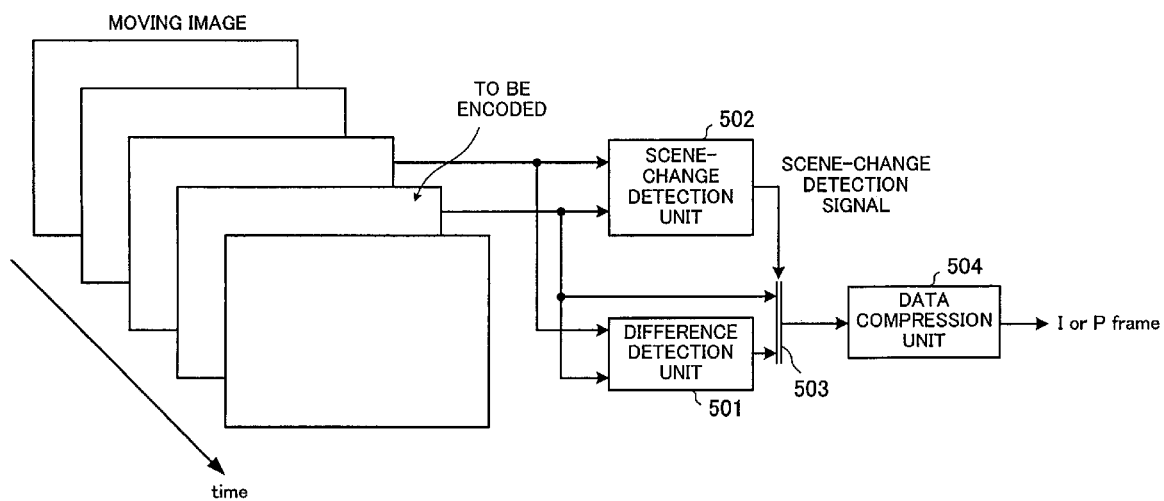
FIG. 9 is a schematic diagram illustrating a construction of a conventional MPEG encoding circuit containing a scene-change detection circuit.

FIG. 8 is a flow diagram indicating a sequence of processing for reading out image data from the DRAM 105 by the CPU 107 in the case where pixels used for detection are arranged as illustrated in FIG. 7, where px, py, and ix are defined as in the case of FIG. 4, and i2y is the displacement, indicated by the number of pixel lines, from each pixel line from which pixels are read out for use in detection to the next pixel line from which pixels are also read out for use in the detection.

<Step S201> The variables x and y for address calculation are initialized. In addition, a flag "even," which is provided for indicating that a pixel line which is to be read out is in an even field, is set to "1."

<Steps S202 to S211> Steps S202 to S211 correspond to steps S102 to S111 in FIG. 5, respectively. That is, when the positions of the pixels indicated by the current addresses do not reach the end of the pixel line, the addresses are designated in the DRAM 105, and the data of the pixels indicated by the addresses are transferred to the scene-change detection circuit 104. In addition, the variable x is incremented by ix in step S210. Thereafter, in step S211, when the address in the horizontal direction indicated by the variable x does not reach the end of the pixel line, the operation goes back to step S202, and processing for reading out the next pixel group constituted by four consecutive pixels is performed. When the address in the horizontal direction reaches the end of the pixel line, the operation goes to step S212.

<Step S212> When the flag "even" is one, the operation goes to step S213. When the flag "even" is zero, the operation goes to step S214.

<Step S213> The variable x is set to ix/2, the variable y is incremented by (i2y/2)+1, the flag "even" is set to zero in order to indicate that an odd pixel line is to be read out, and the operation goes to step S215.

<Step S214> The variable x is set to zero, the variable y is incremented by (i2y/2)-1, the flag "even" is set to one in order to indicate that an even pixel line is to be read out, and the operation goes to step S215.

<Step S215> When the variable y is smaller than py, the operation goes back to step S202, and processing for reading out the next pixel group constituted by four consecutive pixels in the new pixel line is performed. When the variable y is equal to or greater than py, the processing for reading out the data of a picture is completed.

According to the above processing, the utilization efficiency of the system bus 108 increases, and it is possible to prevent concentration of loads in the system bus 108 since the timings of the operations of reading out image data scatter. Therefore, redundancy is generated in the system, and the system operates stably. Further, since the pixels used for detection of a scene change are distributed in both of the even and odd fields in similar manners, it is possible to increase the accuracy in the detection regardless of when the scene change occurs.

The above processing functions can be realized by a computer. In this case, a program for the image processing device is provided. That is, the program describes details of the processing functions which the image processing device should have, and the processing functions of the image processing device are realized on a computer when the computer executes the above program.

The above program describing the details of processing can be stored in a computer-readable recording medium. The computer-readable recording medium may be a magnetic recording device, an optical disc, an optical magnetic recording medium, a semiconductor memory, or the like. The magnetic recording device may be a hard disk drive (HDD), a flexible disk (FD), a magnetic tape, or the like. The optical disc may be a DVD (Digital Versatile Disc), a DVD-R (Recordable)/RW (ReWritable), a DVD-RAM (Random Access Memory), a CD-ROM (Compact Disc Read Only Memory), a CD-R (Recordable)/RW (ReWritable), or the like. The optical magnetic recording medium may be an MO (Magneto-Optical Disc) or the like.

In order to put the program into the market, for example, it is possible to sell a portable recording medium such as a DVD or a CD-ROM in which the program is recorded. Alternatively, the above program can be stored in a storage device belonging to a server computer, and transferred from the server computer to the above computer through a network.

The computer which executes the above program stores the program in a storage device belonging to the computer, where the program is originally recorded in, for example, a portable recording medium, or transferred from the server computer. Then, the computer reads the program from the storage device, and performs processing in accordance with the program. Alternatively, the computer may directly read the program from the portable recording medium for performing processing in accordance with the program. Further, the computer can sequentially execute processing in accordance with each portion of the program when the portion of the program is transferred from the server computer.

As explained above, in the image processing device or the image processing method according to the present invention, data of groups of a predetermined number of pixels consecutively arranged in the horizontal direction in at least a picture which immediately precedes a picture in which presence or absence of a scene change is to be detected are read out from a storage device at intervals, and transferred to the detection processing unit through the data bus. At this time, the number of pixels constituting each of the groups is equalized with the maximum number of pixels which can be transferred through the data bus (which can be determined according to the width of the data bus), or an integer multiple of the maximum number. Therefore, it is possible to increase the utilization efficiency of the data bus, and reduce the time necessary for transfer of image data without decreasing the number of pixels used for the detection. Thus, the load imposed on the data bus and the manufacturing cost can be reduced without decreasing the accuracy in detection of a scene change.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An image processing device for detecting a scene change based on moving-image data, comprising:
    a scene-change detector which detects a scene change between first and second pictures based on differences between thinned-out pixels of the first picture and thinned-out pixels of the second picture, and outputs a detection signal indicating a result of detecting the scene change, where the second picture immediately precedes the first picture; and a transfer controller which controls a first operation of reading out, from a storage device storing said second picture, discrete groups of a predetermined number of pixels consecutively arranged along a horizontal direction in said second picture, and a second operation of transferring said discrete groups as the thinned-out pixels of the second picture to said scene-change detector through a data bus having a width, where said predetermined number is determined based on the width, and corresponds to a maximum number of pixels which can be concurrently transferred through the data bus, or an integer multiple of the maximum number;

wherein said transfer controller controls said first operation in such a manner that said discrete groups of said predetermined number of pixels consecutively arranged along a horizontal direction are read out from each of a plurality of horizontal pixel lines in said second picture, and a maximum number of consecutive horizontal pixel lines from each of which no pixels are read out is smaller than a maximum number of consecutive pixels which are not read out from said plurality of horizontal pixel lines;

wherein said scene-change detector and said transfer controller are each implemented in hardware or a hardware/software combination.

2. The image processing device according to claim 1, wherein said transfer controller controls said first operation so that said discrete groups read out from each of the plurality of pixel lines are staggered in the horizontal direction from said discrete groups of said predetermined number of pixels consecutively arranged along a horizontal direction and read out from an adjacent one of the plurality of pixel lines.

3. The image processing device according to claim 1, wherein said moving-image data are inputted into the image processing device in an interlace mode, and contain frames each of which is constituted by alternating even and odd pixel lines, and said transfer controller controls said first operation in such a manner that said discrete groups of a predetermined number of pixels which are consecutively arranged along a horizontal direction and to be read out are distributed in both of the even pixel lines and the odd pixel lines.

4. An image processing method for detecting a scene change based on moving-image data, comprising, using a computer to perform the steps of:

under control of a transfer control unit, reading out at intervals from a storage device discrete groups of a predetermined number of pixels which are consecutively arranged in a horizontal direction in a first picture, and transferring the discrete groups as thinned-out pixels of the first picture to a scene-change detection unit through a data bus having a width, where the first picture is a picture which immediately precedes a second picture, and said predetermined number is determined based on the width, and corresponds to a maximum number of pixels which can be concurrently transferred through the data bus, or an integer multiple of the maximum number; and by said scene-change detection unit, detecting a scene change between the first and second pictures based on differences between the thinned-out pixels of the first picture and thinned-out pixels of the second picture;

wherein in said reading out groups of pixels the discrete groups of said predetermined number of pixels consecutively arranged along a horizontal direction are read out from each of a plurality of horizontal pixel lines in at least said first picture, and a maximum number of consecutive horizontal pixel lines from each of which no pixels are read out is smaller than a maximum number of consecutive pixels which are not read out from said plurality of horizontal pixel lines.

5. The image processing method according to claim 4, wherein in said reading out groups of pixels, said discrete groups read out from each of the plurality of pixel lines are staggered in the horizontal direction from said discrete groups of said predetermined number of pixels consecutively arranged along a horizontal direction and read out from an adjacent one of the plurality of pixel lines.

6. A computer-readable medium storing an image processing program which makes a computer realize an image processing device for detecting a scene change based on moving-image data, said image processing device comprising:

a scene-change detection unit which detects a scene change between first and second pictures based on differences between thinned-out pixels of the first picture and thinned-out pixels of the second picture, where the second picture immediately precedes the first picture; and a transfer control unit which controls a first operation of reading out, from a storage device storing said second picture, discrete groups of a predetermined number of pixels consecutively arranged along a horizontal direction in said second picture, and a second operation of transferring said discrete groups as the thinned-out pixels of the second picture to said scene-change detection unit through a data bus having a width, where said predetermined number is determined based on the width, and corresponds to a maximum number of pixels which can be concurrently transferred through the data bus, or an integer multiple of the maximum number;

wherein said transfer control unit controls said first operation in such a manner that said discrete groups of said predetermined number of pixels consecutively arranged along a horizontal direction are read out from each of a plurality of horizontal pixel lines in said second picture, and a maximum number of consecutive horizontal pixel lines from each of which no pixels are read out is smaller than a maximum number of consecutive pixels which are not read out from said plurality of horizontal pixel lines.

* * * * *